(12) United States Patent
Son et al.

(10) Patent No.: US 9,287,958 B2
(45) Date of Patent: Mar. 15, 2016

(54) METHOD AND APPARATUS FOR PROCESSING FEEDBACK INFORMATION IN WIRELESS COMMUNICATION SYSTEM SUPPORTING BEAMFORMING

(71) Applicant: Samsung Electronics Co., Ltd., Suwon-si, Gyeonggi-do (KR)

(72) Inventors: Jaeseung Son, Suwon-si (KR); Chanhong Kim, Hwaseong-si (KR); Jiyun Seol, Seongnam-si (KR); Taeyoung Kim, Seongnam-si (KR); Keonkook Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/626,227

(22) Filed: Feb. 19, 2015

(65) Prior Publication Data

US 2015/0236774 A1    Aug. 20, 2015

(30) Foreign Application Priority Data

Feb. 20, 2014    (KR) .......................... 10-2014-0019438

(51) Int. Cl.
*H04L 1/02*    (2006.01)
*H04B 7/06*    (2006.01)
*H04B 7/08*    (2006.01)

(52) U.S. Cl.
CPC ............ *H04B 7/0628* (2013.01); *H04B 7/0632* (2013.01); *H04B 7/0639* (2013.01); *H04B 7/0695* (2013.01); *H04B 7/088* (2013.01)

(58) Field of Classification Search
CPC .. H04B 7/0417; H04B 7/0619; H04B 7/0695; H04B 7/0452; H04B 7/088; H04L 1/0618; H04L 1/06; H04L 67/22

USPC ................. 375/267, 260, 347, 349; 370/335; 455/456.1

See application file for complete search history.

(56) References Cited

U.S. PATENT DOCUMENTS

| | | | |
|---|---|---|---|
| 2004/0214606 A1* | 10/2004 | Wichman et al. | 455/562.1 |
| 2009/0318157 A1* | 12/2009 | Hoshino et al. | 455/450 |
| 2011/0096738 A1 | 4/2011 | Choi | |
| 2012/0120998 A1 | 5/2012 | Fakhrai et al. | |
| 2013/0182683 A1* | 7/2013 | Seol et al. | 370/335 |
| 2013/0231059 A1 | 9/2013 | Prasad et al. | |
| 2013/0301454 A1 | 11/2013 | Seol et al. | |
| 2013/0343303 A1 | 12/2013 | Kim et al. | |
| 2014/0004898 A1 | 1/2014 | Yu et al. | |

FOREIGN PATENT DOCUMENTS

WO    2014/003499 A1    1/2014

* cited by examiner

*Primary Examiner* — Khai Tran
(74) *Attorney, Agent, or Firm* — Jefferson IP Law, LLP

(57) ABSTRACT

A method and an apparatus for processing feedback information in a wireless communication system supporting a beamforming are provided. The method includes receiving reference signals for each of at least one of transmitted beams which are transmitted from a base station with respect to each received beam of the terminal, determining reception power related information for a beam combination including each of the at least one of the transmitted beams and the received beam, determining channel capacities for each beam combination targeted beam combinations of which each value is equal to or greater than a certain critical value, as a result of the determining of the reception power related information, and determining best beam related information based on the result of the determining of the channel capacities.

28 Claims, 15 Drawing Sheets

METHOD AND APPARATUS FOR PROCESSING FEEDBACK INFORMATION IN WIRELESS COMMUNICATION SYSTEM SUPPORTING BEAMFORMING

CROSS-REFERENCE TO RELATED APPLICATION(S)

This application claims the benefit under 35 U.S.C. §119 (a) of a Korean patent application filed on Feb. 20, 2014 in the Korean Intellectual Property Office and assigned Serial number 10-2014-0019438, the entire disclosure of which is hereby incorporated by reference.

TECHNICAL FIELD

The present disclosure relates to a method and an apparatus for processing feedback information in a wireless communication system for supporting a beamforming. More particularly, the present disclosure relates to a method and an apparatus for processing feedback information in a wireless communication system supporting a hybrid beamforming using an analog beamforming and a digital beamforming.

BACKGROUND

Typically, a wireless communication system has been developed to provide voice services while ensuring the mobility of users. However, the wireless communication system has been expanded from the voice service to a data service. In recent years, the wireless communication system has been developed to provide a high-speed data service. However, currently, the wireless communication system that provides services suffers from a lack of resources, and users require the wireless communication system to provide higher-speed services to them. Accordingly, there is a necessity for more advanced wireless communication systems.

In the same context, an amount of average data which is used by users of the wireless communication system has been increasing geometrically owing to the use of a wireless terminal, such as a smart phone. In addition to that, users' demands for a higher data transmission rate have been continuously increasing.

In general, a method of providing a high data transmission rate includes a method of providing a communication using a wider frequency band and a method of increasing frequency usage efficiency.

However, it is very difficult to provide a higher average data transmission rate through the latter method. This is because communication technologies of a current generation provide frequency usage efficiency close to a theoretical limit and thus, it is very difficult to increase the frequency usage efficiency up to that or more through a technical improvement.

Accordingly, it can be said that a feasible method for increasing the data transmission rate is a method of providing data services through the wider frequency band. At this time, the thing to consider is an available frequency band. In view of the current frequency distribution policy, a band in which a broadband communication of 1 GHz or more is possible is limited and a practically selectable frequency band is the millimeter wave band of 30 GHz or more.

Such a signal of the high frequency band causes severe signal attenuation according to a distance differently from a signal of a frequency band of 2 GHz used by the cellular systems of the related art. Due to such signal attenuation, a coverage area providing service of a base station using the same power as the cellular systems of the related art is considerably reduced. In order to address this issue, a beamforming technique is widely used which concentrates transmission/reception power into a narrow space to increase transmission/reception efficiency of an antenna.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is underway based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

However, in a wireless communication system supporting the beamforming of the related art, optimum analog beams (e.g., a Tx beam ID) according to each array antenna should be selected, a digital precoding vector applied to a signal connected to a plurality of array antennas should be determined. However, a delay may occur, owing to the time taken processing these selections and the determination.

Therefore, a need exists for a method and an apparatus for reducing a feedback delay in a wireless communication system based on a superhigh frequency beamforming technique.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for reducing a feedback delay in a wireless communication system based on a superhigh frequency beamforming technique.

Another aspect of the present disclosure is to provide an apparatus and a method for reducing complexity when an optimum analog beam direction and a precoding matrix index are calculated in a wireless communication system based on a superhigh frequency beamforming technique.

In accordance with an aspect of the present disclosure, a method of determining a beam of a terminal in a wireless communication system supporting a beamforming is provided. The method includes receiving reference signals for each of at least one of transmitted beams which are transmitted from a base station, with respect to each received beam of the terminal, determining reception power related information for a beam combination including each of the at least one of the transmitted beams and the received beam, determining channel capacities for each beam combination targeted beam combinations of which each value is equal to or greater than a certain critical value, as a result of the determining of the reception power related information, and determining best beam related information based on the result of the determining of the channel capacities.

In accordance with an aspect of the present disclosure, a method of determining a beam of a terminal in a wireless communication system supporting a beamforming is provided. The method includes receiving reference signals for each of at least one of transmitted beams which are transmitted from a base station, with respect to each received beam of the terminal, selecting certain numbers of analog beam combinations maximizing a channel capacity among analog combinations including each of the at least one of the transmitted beams and the received beam, determining the channel capacity of the selected combination of the analog beams, and determining best beam related information based on a result of the determining of the channel capacity.

In accordance with an aspect of the present disclosure, a method of determining a beam of a terminal in a wireless communication system supporting a beamforming is provided. The method includes receiving reference signals for each of at least one of transmitted beams which are transmitted from a base station, with respect to each received beam of the terminal, determining a channel capacity for a beam combination including each of the at least one of the transmitted beams and the received beam, and determining best beam related information based on a result of the determining of the channel capacity. The determining of the channel capacity includes averaging a channel state for at least one subcarrier in which each of the at least one of the transmitted beams having the same identifier is transmitted, and determining the channel capacity based on the averaged channel state.

In accordance with an aspect of the present disclosure, a method of transmitting feedback information of a terminal in a wireless communication system supporting a beamforming is provided. The method includes receiving reference signals for each of at least one of transmitted beams which are transmitted from a base station with respect to each received beam of the terminal in a first superframe including at least one frame, generating first feedback information for a beam combination including each of the at least one of the transmitted beams and the received beam and transmitting the generated first feedback information to the base station in a certain timing, receiving the reference signal for each of the at least one of the transmitted beams which is transmitted from the base station with respect to each received beam of the terminal while a first frame in a second superframe is elapsed after the first superframe is arrived, and generating second feedback information based on the first superframe and the first frame in the second superframe and transmitting the generated second feedback information to the base station in certain timing.

In accordance with an aspect of the present disclosure, a terminal for determining a beam in a wireless communication system supporting a beamforming is provided. The terminal includes a transmitting and receiving unit configured to transmit and receive a signal to and from a base station, and at least one processor configured to control to receive reference signals for each of at least one of transmitted beams which are transmitted from the base station with respect to each received beam of the terminal, to determine reception power related information for a beam combination including each of the at least one of the transmitted beams and the received beam, to determine channel capacities for each beam combination targeted beam combinations of which each value is equal to or greater than a certain critical value as a result of the determining of the reception power related information, and to determine best beam related information based on the result of the determining of the channel capacities.

In accordance with an aspect of the present disclosure, a terminal for determining a beam in a wireless communication system supporting a beamforming is provided. The terminal includes a transmitting and receiving unit configured to transmit and receive a signal to and from a base station, and at least one processor configured to control to receive reference signals for each of at least one of transmitted beams which are transmitted from the base station with respect to each received beam of the terminal, to select certain numbers of analog beam combinations maximizing a channel capacity among analog combinations including each of the at least one of the transmitted beams and the received beam, to determine the channel capacity of the selected analog beam combination, and to determine best beam related information based on a result of the determining of the channel capacity.

In accordance with an aspect of the present disclosure, a terminal for determining a beam in a wireless communication system supporting a beamforming is provided. The terminal includes a transmitting and receiving unit configured to transmit and receive a signal to and from a base station, and at least one processor configured to control to receive reference signals for each of at least one of transmitted beams which are transmitted from the base station with respect to each received beam of the terminal, to determine a channel capacity for a beam combination including each of the at least one of the transmitted beams and the received beam, and to determine best beam related information based on a result of the determining of the channel capacity. The processor is further configured to average a channel state for at least one subcarrier in which each of the at least one of the transmitted beams having the same identifier is transmitted, and to determine the channel capacity based on the averaged channel state.

In accordance with an aspect of the present disclosure, a terminal for transmitting feedback information in a wireless communication system supporting a beamforming is provided. The terminal includes a transmitting and receiving unit configured to transmit and receive a signal to and from a base station, and at least one processor configured to control to receive reference signals for each of at least one of transmitted beams which are transmitted from the base station with respect to each received beam of the terminal in a first superframe including at least one frame, to generate first feedback information for a beam combination including each of the at least one of the transmitted beams and the received beam, to transmit the generated first feedback information to the base station in a certain timing, to receive the reference signal for each of the at least one of the transmitted beams which is transmitted from the base station with respect to each received beam of the terminal while a first frame in a second superframe is elapsed after the first superframe is arrived, to generate second feedback information based on the first superframe and the first frame in the second superframe, and to the generated second feedback information to the base station in certain timing.

In a wireless communication system based on a hybrid beamforming using a superhigh frequency band, according to an embodiment of the present disclosure, when a best beam identifier (ID), a PMI and the like are fedback using a Beam Measurement Reference Signal (BM-RS), a feedback delay can be reduced. Therefore, performance degradation owing to a feedback delay and a processing delay can be prevented.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
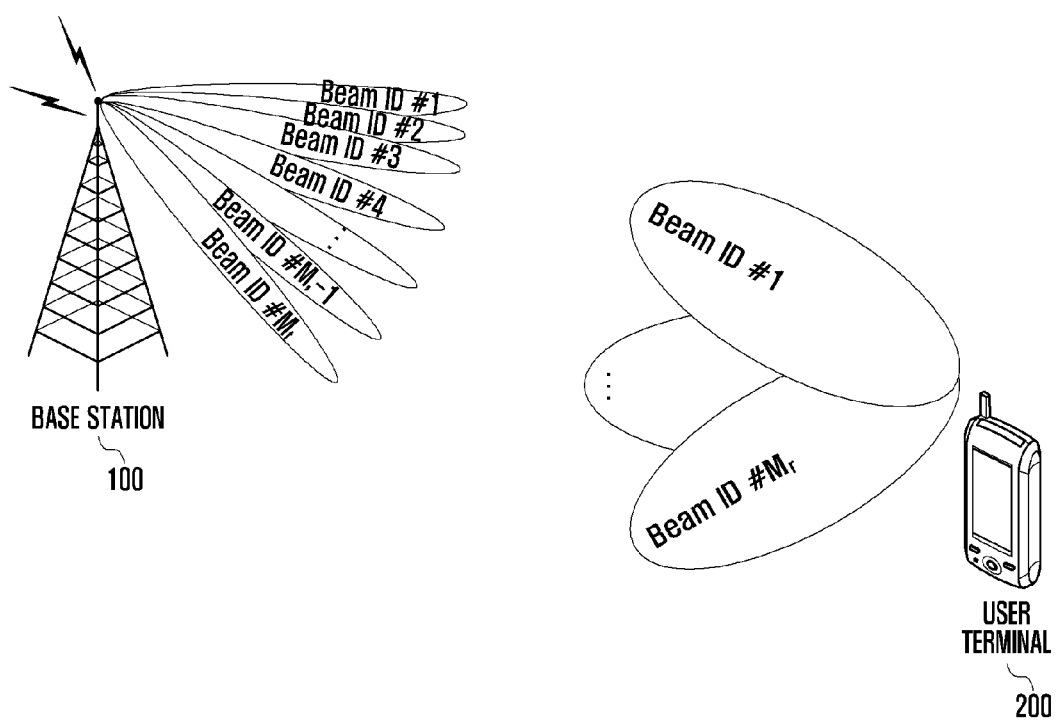
FIG. 1 illustrates a beamforming technique of a superhigh frequency band system applied according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In describing the various embodiments of the present disclosure, descriptions related to technical contents which are well-known in the art to which the present disclosure pertains, and are not directly associated with the present disclosure, will be omitted. Such an omission of unnecessary descriptions is intended to prevent obscuring of the main idea of the present disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the present disclosure and ways to achieve them will be apparent by making reference to embodiments as described below in conjunction with the accompanying drawings. However, the present disclosure is not limited to the embodiments set forth below, but may be implemented in various different forms. The following embodiments of the present disclosure are provided to completely disclose the present disclosure and inform those skilled in the art of the scope of the present disclosure, and the present disclosure is defined by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a Field Programmable Gate Array (FPGA) or an Application Specific Integrated Circuit (ASIC), which performs a certain function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, microcodes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more Central Processing Units (CPUs) within a device or a security multimedia card.

Hereinafter, a method of processing feedback information in a hybrid beamforming wireless communication system using an analog beamforming and a digital beamforming according to various embodiments of the present disclosure will be described.

FIG. 1 illustrates a beamforming technique of a superhigh frequency band system applied according to an embodiment of the present disclosure.

The wireless communication system has been developed to support a relatively higher data transmission rate in order to meet a continuously increasing wireless data traffic demand.

A 4G system to the present pursues a technique development for improving frequency efficiency (i.e., spectral efficiency) in order to increase a data transmission rate. However, it is difficult to meet a rapidly increasing wireless data traffic demand using the technique development for improving frequency efficiency.

A method for addressing such issue is using a very wide frequency band. Since it is very difficult to secure a wide frequency band in a frequency (<5 GHz) used in a current mobile communication cellular system, such a wide band frequency should be secured in a higher frequency.

However, the higher a transmission frequency for a wireless communication is, the larger an electromagnetic wave path loss is. An electromagnetic wave becomes relatively short due to this, and thus a service coverage area is reduced. An important technology for addressing the issue of reducing the electromagnetic path loss and increasing a transferal distance of the electromagnetic wave is a beamforming technology shown in FIG. 1.

Referring to FIG. 1, a transmit beamforming corresponds to a method of generally concentrating signals transmitted from respective antennas of a plurality of antennas on a particular direction. In a case in which a base station 100 of FIG. 1 is exemplified, as shown in FIG. 1, the base station 100 transmits reference signals in directions of different beams. For an identification between the beams, a beam identifier (i.e., a beam ID) may be in the inside of the reference signal. In addition, the beam ID may be identified according to whether the reference signal received from a receiver corresponds to which OFDM symbol. For example, the beam ID may be determined also based on a frame structure. As described above, the signals having different beam IDs are concentrated in specific directions, respectively.

In an embodiment of the present disclosure described below, a form in which a plurality of antennas are set is referred to as an array antenna, and an antenna in the array antenna is referred to as an element antenna.

Through the use of the transmit beamforming, the electromagnetic arrival distance of the signal can be increased, and interference influencing another user is significantly reduced since the signal is not transmitted in any direction other than the corresponding direction.

Meanwhile, even in a reception side, a received beamforming may be performed using a receiving array antenna, this also increases a receiving sensitivity of a signal input in a corresponding direction by concentrating a reception of the electromagnetic wave in a specific direction and blocks an interference signal by excluding a signal input in a direction except for the corresponding direction from the received signal. As shown in FIG. 1, when a user terminal 200 receives a transmitted beam transmitted from the base station, the user terminal 200 concentrates a receiving array antenna in a specific direction and thus the user terminal 200 can increase a received signal sensitivity of the transmitted beam.

Since the higher a transmission frequency is, the shorter a wavelength of an electromagnetic wave is, when an antenna is configured in a half wave distance, the array antenna may include more element antennas in the same area. For example, a communication system operating at a high frequency band is well positioned to apply the beamforming technique because the communication system can acquire a relatively higher antenna gain in comparison with using the beamforming technique at a low frequency band.

As shown in FIG. 1, when the base station 100 transmits the beam identifier (i.e., the beam ID) according to each beamforming direction, the user terminal 200 may identify a transmitted beam identifier (i.e., a Tx beam ID) of the base station 100 and a received beam identifier (i.e., an Rx beam ID) of the user terminal 200, which are best to a user.

In the wireless communication system supporting the above-mentioned beamforming, an optimum analog beam (i.e., the Tx beam ID) according to each array antenna should be selected, and a digital precoding vector applied to a signal connected to a plurality of array antennas should be determined.

The analog beam and the precoding vector determined through above-mentioned process may be transmitted to the base station 100 and may be used in a user scheduling together with an Orthogonal Frequency Division Multiple Access (OFDMA) technique.

In this case, the analog beam and the digital precoding vector should be determined. To this end, in the hybrid beamforming system, a Beam Measurement Reference Signal (BM-RS) may be used.

One frame in the wireless communication system supporting the beamforming applied to the present disclosure may be formed of at least one slot like an LTE system. Hereinafter, a frame structure of an BM-RS according to an embodiment of the present disclosure will be described.

Figure 2:
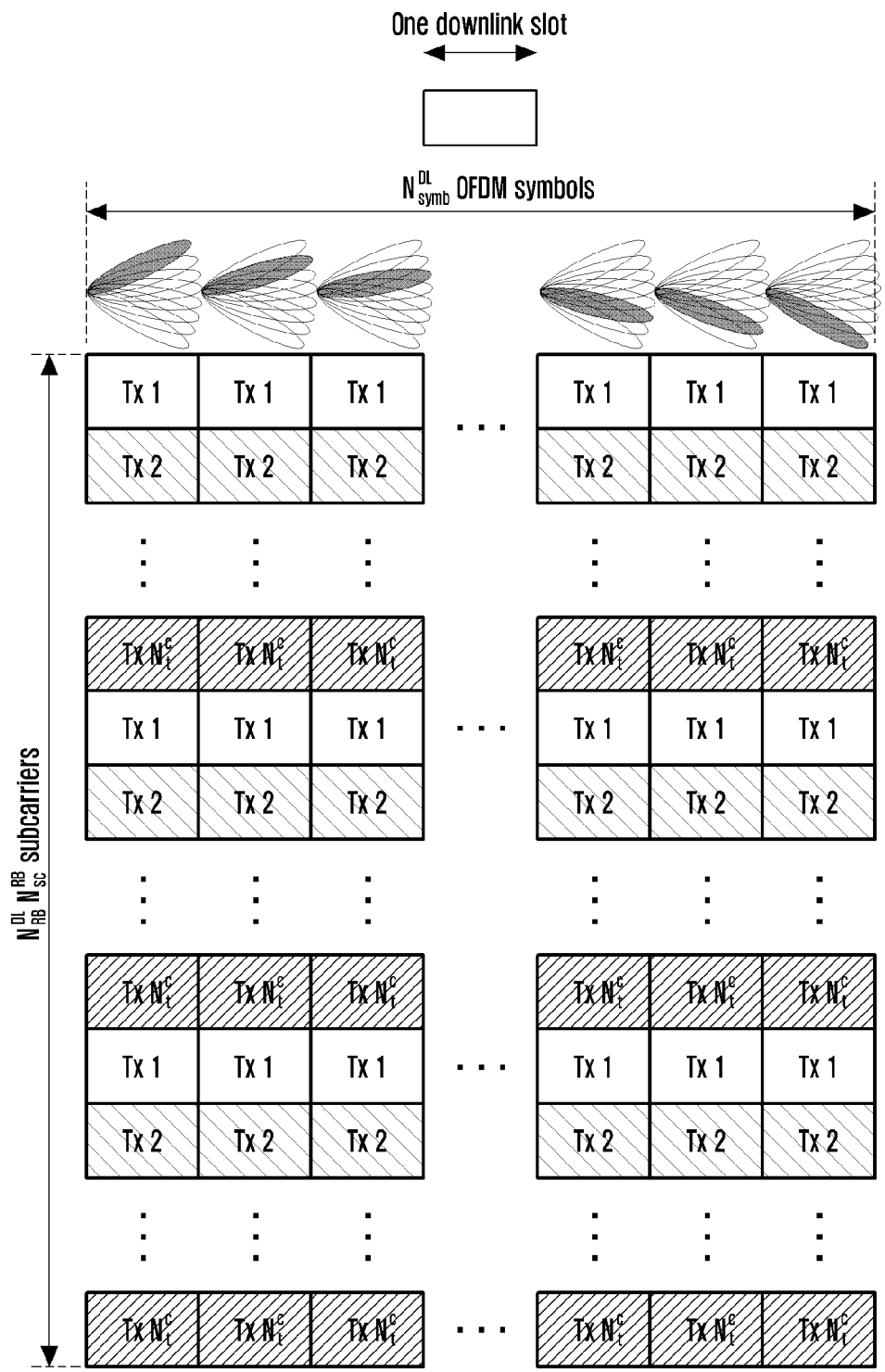
FIG. 2 illustrates a frame structure of a Beam Measurement Reference Signal (BM-RS) in a case of one slot according to an embodiment of the present disclosure.

FIG. 2 illustrates a frame structure of a BM-RS in a case of one slot according to an embodiment of the present disclosure.

Referring to FIG. 2, in the frame structure of the BM-RS, $N_{symb}^{DL}$ OFDM symbols may be used in a time axis, and the base station may transmit the BM-RS according to each OFDM symbol (i.e., each analog beam direction).

In addition, in the frame structure of the BM-RS, $N_{RB}^{DL}$ $N_{SC}^{RB}$ subcarriers may be used, and the base station may repeatedly transmit the BM-RS according to each frequency (i.e., an antenna port). ($N_{RB}^{DL}$) is the number of Resource Blocks (RBs) allocated to a downlink band, and ($N_{SC}^{RB}$) is the number of subcarriers allocated in each RB.

Meanwhile, since the base station can not know how many analog beams may be supported, the analog beam of the terminal is not considered in the structure of the BM-RS.

Figure 3A:
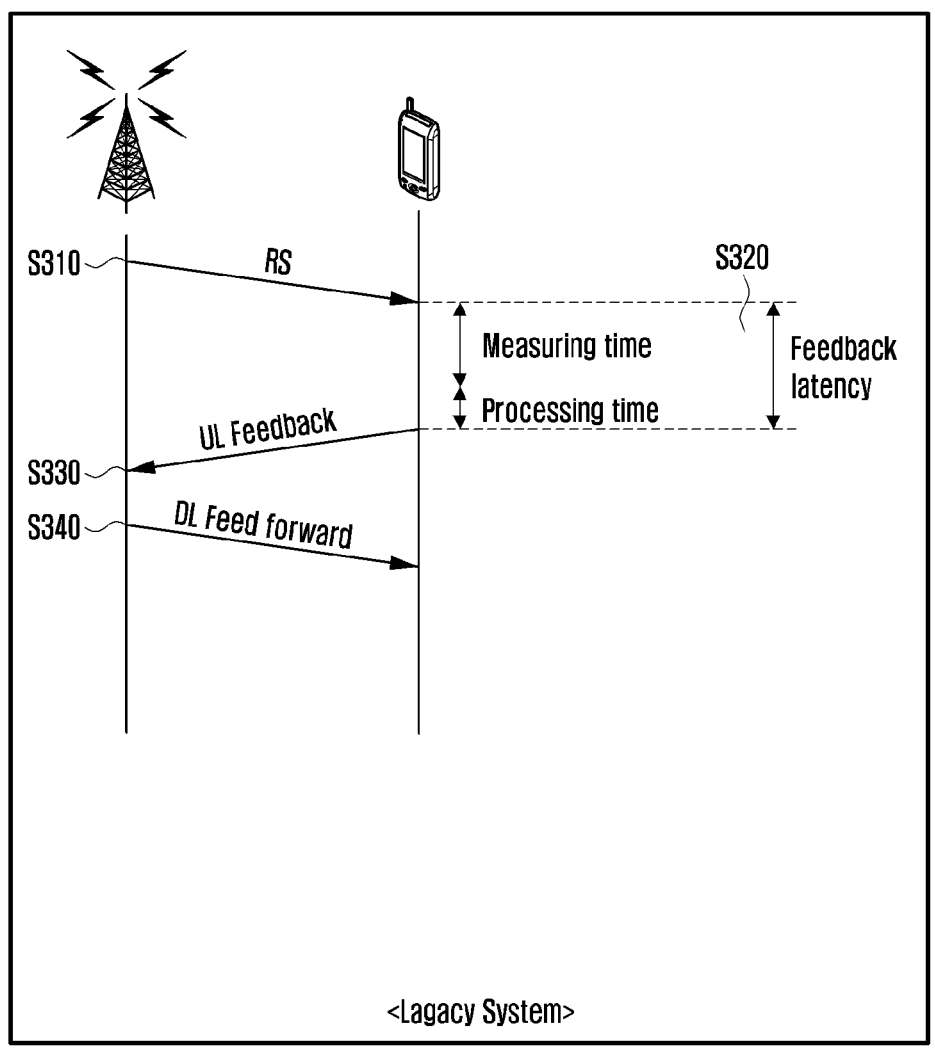
FIGS. 3A and 3B are flowcharts illustrating a process of transmitting feedback information in a wireless communication system according to various embodiments of the present disclosure.
Figure 3B:
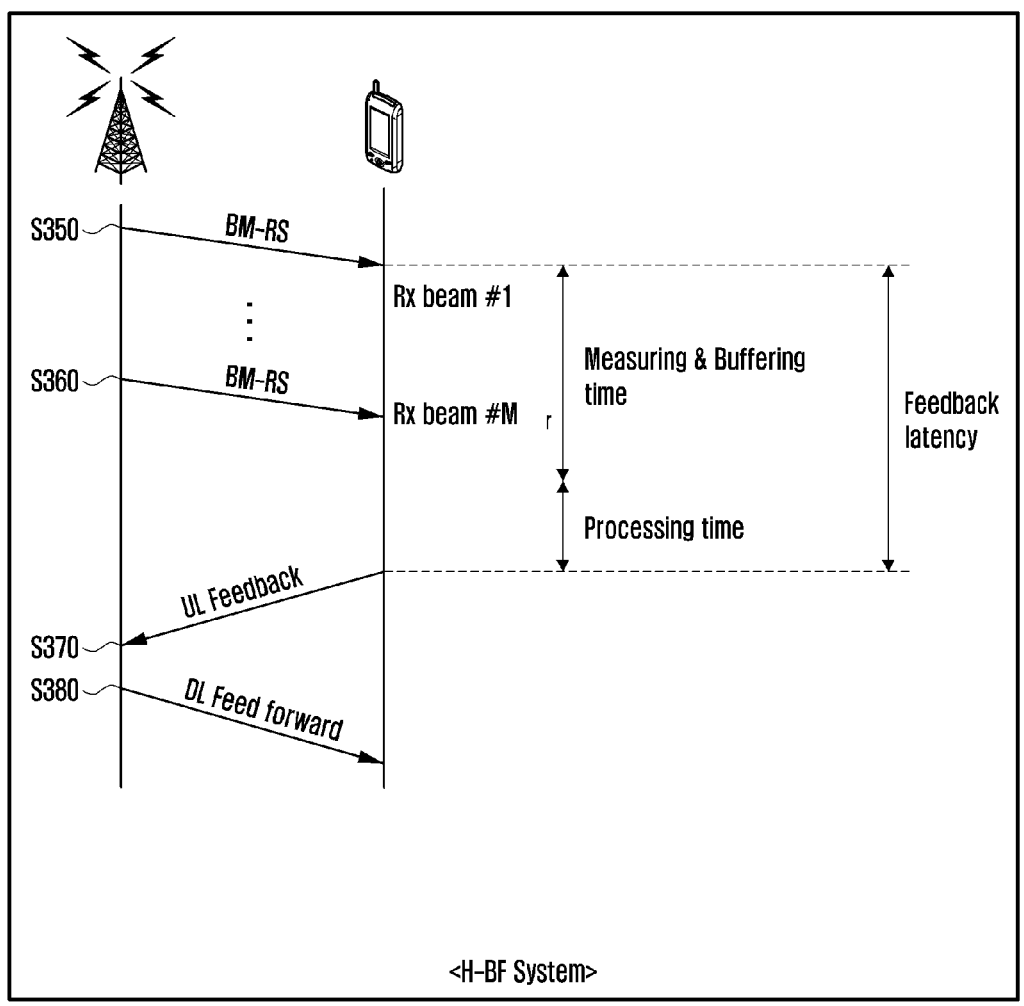

FIGS. 3A and 3B are flowcharts illustrating a process of transmitting feedback information in a wireless communication system according to various embodiments of the present disclosure.

First, FIG. 3A is a flowchart illustrating a Multi Input Multi Output (MIMO) feedback delay (i.e., latency) in a first wireless communication system according to an embodiment of the present disclosure. The first wireless communication system may include a wireless communication system in which a beamforming technique is not applied.

Referring to FIG. 3A, in operation S310, a base station transmits a reference signal to the terminal for a channel measurement of the terminal Thereafter, in operation S320, the terminal measures the reference signal transmitted from the base station and generates feedback information. The feedback information may include, for example, channel state information, precoding matrix index information, rank index information, and the like.

In this case, a measuring time which is a time required in measuring the reference signal which is transmitted from the base station by the terminal and a processing time which is a time required in generating the feedback information may be referred to as the feedback latency.

When the feedback information is generated, in operation 330, the terminal may transmit the generated feedback information to the base station through an uplink channel.

Thereafter, in operation 340, the base station may transmit downlink information, for example, scheduling information and the like to the terminal.

Thereafter, FIG. 3B is a flowchart illustrating a MIMO feedback latency in a second wireless communication system according to an embodiment of the present disclosure. The second wireless communication system may include a wireless communication system in which a beamforming technique is applied.

Referring to FIG. 3B, the base station may transmit a beam measurement reference signal for measuring a beam of the terminal, that is, a BM-RS through operations 350 to 360. In this case, the base station may transmit reference signals for all transmitted beams.

Thereafter, the terminal measures all reference signals for each beam transmitted from the base station and generates feedback information. The feedback information may include, for example, channel state information, precoding matrix index information, rank index information, and the like.

When the feedback information is generated, in operation 370, the terminal may transmit the generated feedback information to the base station through an uplink channel.

Thereafter, in operation 380, the base station may transmit downlink information, for example, scheduling information and the like to the terminal.

As described with reference to FIG. 3B, since the BM-RS for all analog beam directions of the terminal should be received (e.g., the BM-RS is designed based on a Tx analog beam as described above) in the second wireless communication system differently from the first wireless communication system, a time which is not necessary in the first wireless communication system is additionally necessary in the second wireless communication system.

In addition, a combination of a digital precoding is considered in the first wireless communication system. In contrast, since combinations of the analog beam and the digital precoding should be considered in the second wireless communication system, a processing time in the second wireless communication system increases compared to the first wireless communication system.

Due to above-mentioned two kines of elements, the MIMO feedback latency in the second wireless communication system using the beamforming increases compared to the first wireless communication system which does not use a beamforming.

In embodiments of the present disclosure, a method capable of reducing the feedback latency in such a situation, and an apparatus and a method capable of reducing complexity in determining an optimum analog beam direction are proposed.

Figure 4:
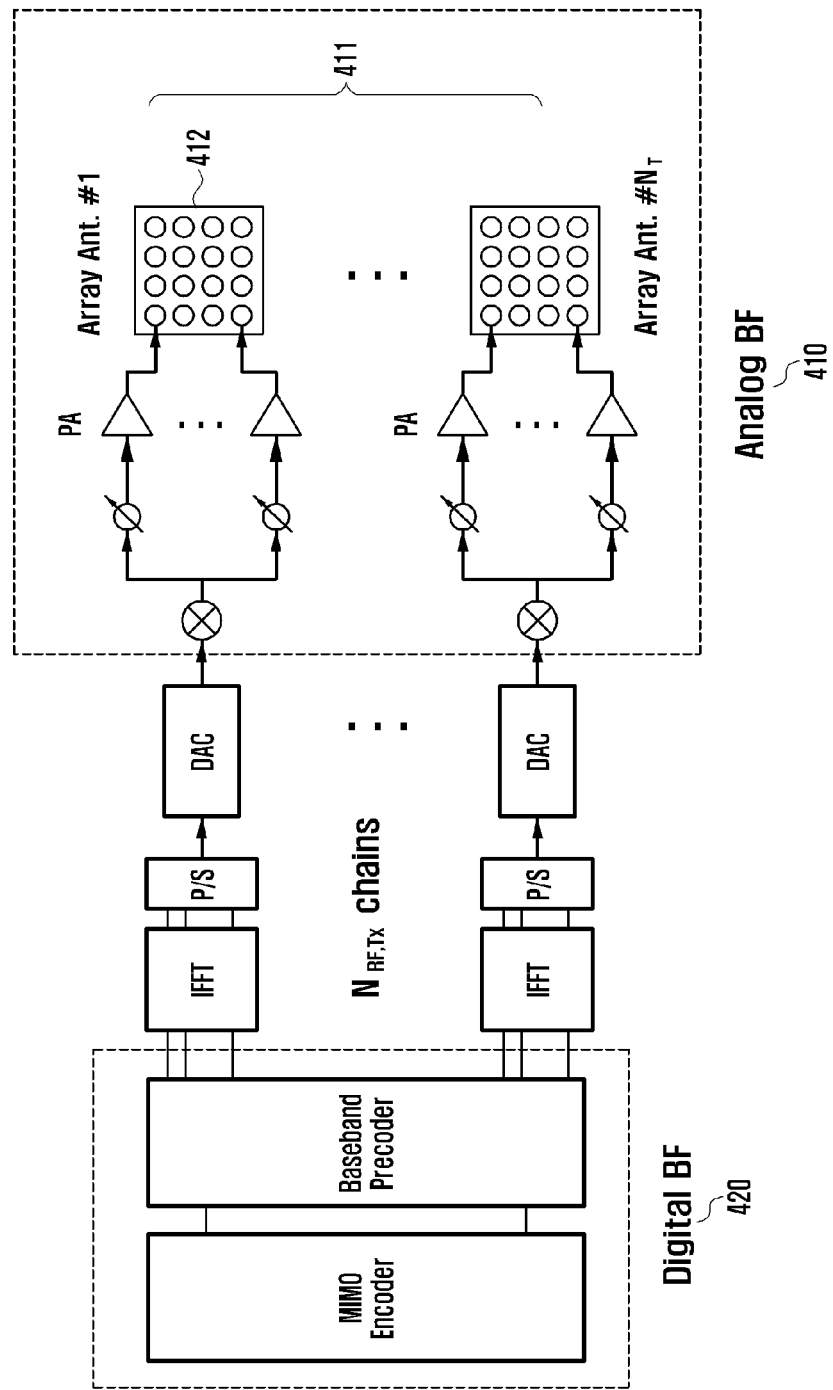
FIG. 4 is a block diagram illustrating a superhigh frequency band beamforming transmission end structure according to an embodiment of the present disclosure.

FIG. 4 is a block diagram illustrating a superhigh frequency band beamforming transmission end structure according to an embodiment of the present disclosure.

Referring to FIG. 4, in a Hybrid BeamForming (H-BF) system, according to an embodiment of the present disclosure, a hybrid beamforming structure including an analog beamforming unit 410 and a digital precoder unit 420 is considered.

The analog beamforming unit 410 includes $N_T$ array antennas 411, one array antenna includes $N_T^{RF}$ element antennas 412, and transmits data by applying a beamforming.

Each array antenna 411 may form an analog beam in all directions in a service area, and a direction of the analog beam is determined in advance. According to an embodiment of the present disclosure, the array antenna 411 may transmit one or more beams or may transmit the beam in one or more directions, but is not limited thereto. In this case, a receiving end (e.g., a terminal) may identify that which array antenna transmits the beam, using resources, such as a time and a frequency, in which the beam is transmitted, even though beam indexes of the beams transmitted from each array antenna are the same.

Meanwhile, as not shown in the figure, a structure of the receiving end may be the same as a structure of a transmitting end. However, the number of element antennas in each array antenna of the receiving end may be lower than that of the transmitting end.

The transmitting end may transmit the BM-RSs in which the analog beams determined in advance are applied. The terminals (i.e., receiving ends) may select analog beam of the transmitting and receiving ends, which is suitable therefor.

In addition, in the beamforming structure as shown in FIG. 4, since the plurality of array antennas are included in each of transmitting and receiving ends, and the analog beams may be formed according to each array antenna, the analog beams should be selected according to each array antenna. Since the plurality of array antennas are used in addition to the plurality of analog beam, the digital precoding may be applied in a baseband.

As described above, in order to apply the digital precoding, $N_T$ array antennas are included in FIG. 4, and thus a preferable precoding vector may be applied among $N_T$ dimensional of digital code book.

To this end, the transmitting end and the receiving end determine the analog beam and the digital precoding vector using the BM-RSs.

Hereinafter, various embodiments of the present disclosure will be described.

As described above, the receiving end may determine a best beam ID and a PMI and the like after receiving the BM-RS by all analog beam combinations.

Figure 5:
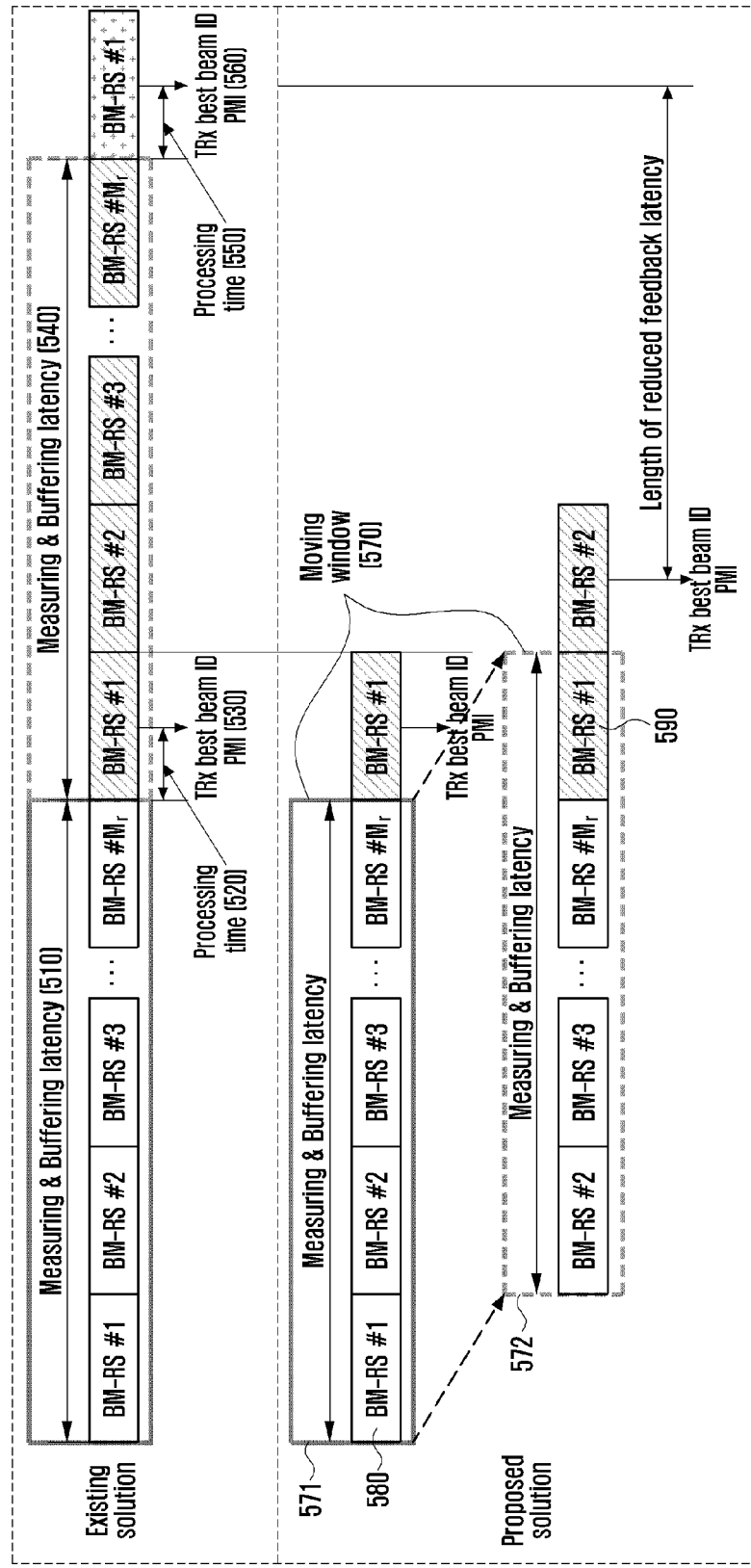
FIG. 5 illustrates a feedback method according to an embodiment of the present disclosure.

Meanwhile, the terminal (e.g., the receiving terminal) according to an embodiment of the present disclosure may feed back the best beam ID and the PMI using a concept, such as a moving window shown in FIG. 5.

FIG. 5 illustrates a feedback method according to an embodiment of the present disclosure.

Referring to FIG. 5, in a case of a feedback method by receiving the BM-RSs by all analog beam combinations by the receiving end, the terminal should receive the BM-RS for all analog beam directions. Thus, a measuring & buffering latency 510 may occur.

In addition, after a delay time of a processing time 520 when the best beam ID and the PMI for all possible combinations of analog beam and the digital precoder are selected is elapsed, a transmitted and received (TRx) best beam ID and the PMI may be identified and thus a MIMO feedback 530 may be performed.

After the MIMO feedback is performed, in order to perform a next MIMO feedback, a MIMO feedback 560 is possible after the terminal receives 540 and processes 550 the BM-RS with respect to all analog beam directions again.

However, when a moving window 570 proposed in an embodiment of the present disclosure is considered, the terminal may not wait for a reception of the BM-RS for all analog beam directions. For example, the terminal may perform the MIMO feedback after calculating the transmitted and received (TRx) best beam ID and the PMI for a newly updated beam combination based on a previous received BM-RS 580 and a newly received BM-RS 590.

For example, the terminal calculates the transmitted and received (TRx) best beam ID and the PMI and gives a feedback of a result after receiving all BM-RSs including BM-RS #1 to BM-RS #$M_r$.

Thereafter, the terminal moves 572 the moving window by one frame (e.g., in an embodiment of the present disclosure, it is assumed that one superframe includes nine frames) after a first feedback period 571 is elapsed. A state in which the moving window is moved by one frame after the first feedback period 571 is elapsed may be referred to as a second feedback period 572 in an embodiment of the present disclosure.

The terminal may receive BM-RS #1 again in an initial frame of the second feedback period 572. The terminal may determine whether the transmitted and received (TRx) best beam ID and the PMI are changed based on the BM-RSs including BM-RS #2 to BM-RS #$M_r$ received in the first feedback period 571 and BM-RS #1 received in the second feedback period 572. Since the transmitted and received (TRx) best beam ID and the PMI for a beam combination during the first feedback period are determined in advance, an additional calculation is not necessary, and the transmitted and received (TRx) best beam ID and the PMI for a combination related to the BM-RS received during the second feedback period is determined. In addition, when the transmitted and received (TRx) best beam ID and the PMI are changed, the terminal may feed back the result to the base station (i.e., the transmitting end). Although the transmitted and received (TRx) best beam ID and the PMI are changed, the terminal may feed back the result, and this may be determined through an appointment between the base station and the terminal.

According to the above-mentioned method, the feedback latency may be reduced compared to a technique receiving BM-RS by all analog beam combinations.

In this case, Equation 1 shows an existing BM-RS, a newly received BM-RS and the number of the combinations of the beam which can be determined when the BM-RS is received.

$$\left(N_T^{b N_r^c} - (N_T^b - 1)^{N_r^c}\right) = N_t^{b N_r^c} \quad \text{Equation 1}$$

At this time, $N_r^b$ is the number of Rx chains, $N_T^b$ is the number of Tx chains, $N_r^b$ is the number of Rx beams, and $N_T^b$ is the number of Tx beams.

Hereinafter, a procedure related to a MIMO feedback period between the base station and the terminal will be described with reference to FIGS. 6 and 7.

Figure 6:
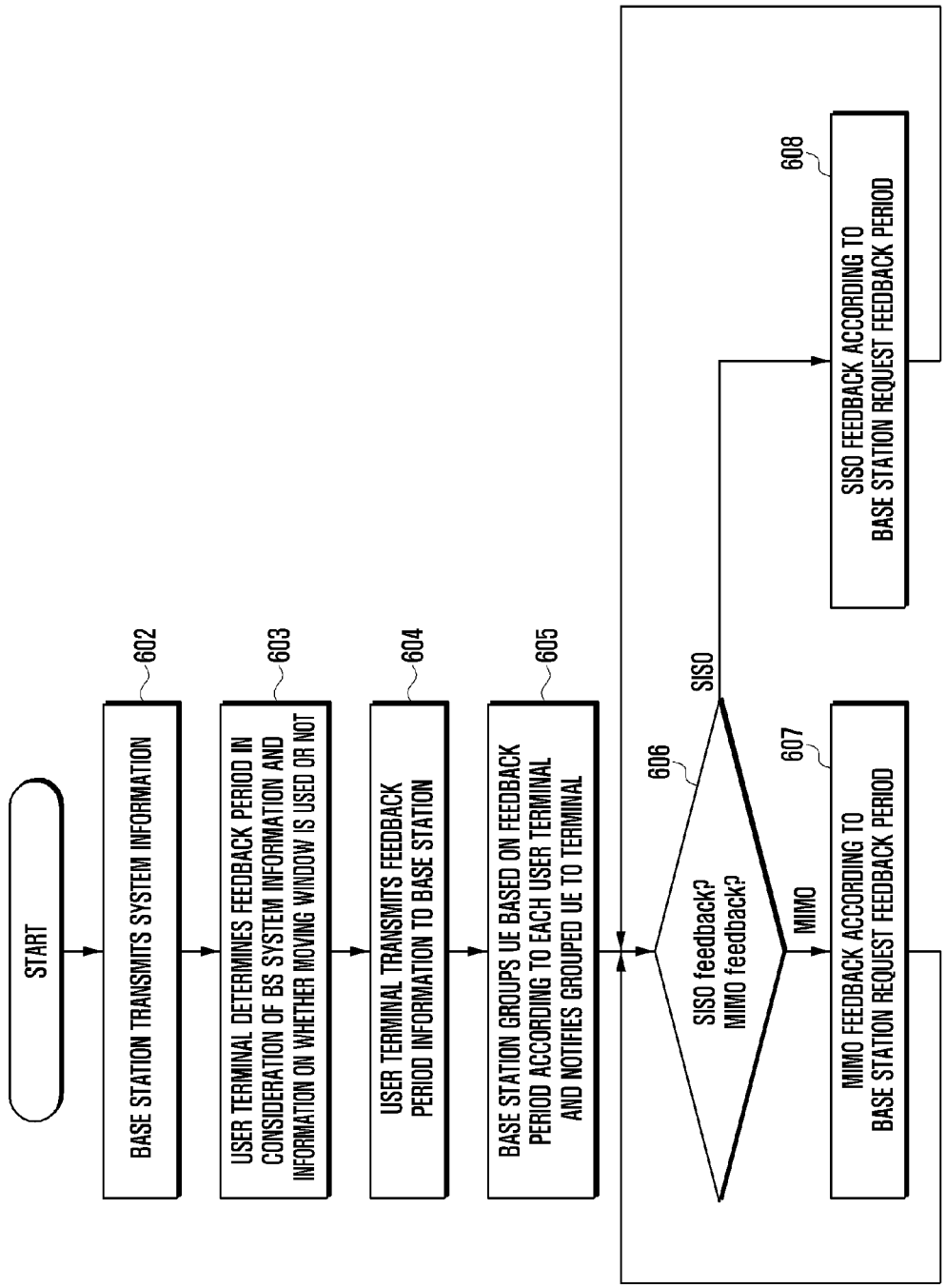
FIG. 6 is a flowchart illustrating a process of determining a feedback period and transmitting feedback information according to the determined feedback period by a terminal according to an embodiment of the present disclosure.

FIG. 6 is a flowchart illustrating a process of determining a feedback period and transmitting feedback information according to the determined feedback period by the terminal according to an embodiment of the present disclosure.

FIG. 6 is a flowchart illustrating a process of determining a feedback period and transmitting feedback information according to the determined feedback period by a terminal according to an embodiment of the present disclosure.

Referring to FIG. 6, in operation 602, the base station may transmit system information to the terminal. In this case, the system information transmitted from the base station to the terminal may include at least one of the number of chains (e.g., the number of ports) which may be operated in the base station, the number of analog beams (e.g., the number of the beams per one chain) which may be operated in the base station, and a BM-RS type. In this case, the BM-RS type may be separated as a position of the BM-RS due to a frame structure. For example, the BM-RS type may instruct whether the BM-RS is transmitted through an adjacent frequency (or a subcarrier) or the BM-RS is transmitted in a regular distance, as a method of transmitting the BM-RS.

Thereafter in operation 603, the terminal may determine the feedback period based on the system information transmitted from the base station and information on whether the moving window is used or not. Thereafter, in operation 604, the terminal transmit the determined feedback period to the base station.

Thereafter, in operation 605, the base station may group users based on the feedback period according to each user terminal and notify the grouped user to the terminal.

Thereafter, in operation 606, the terminal identifies whether the feedback requested from the base station is a Single Input Single Output (SISO) mode or a MIMO mode.

In the case of the MIMO mode, the terminal performs operation 607 to transmit the MIMO feedback to the base station according to the feedback period requested by the base station. In contrast, in the case of the SISO mode, the terminal performs operation 608 to transmit the SISO feedback to the base station according to the feedback period requested by the base station.

Figure 7:
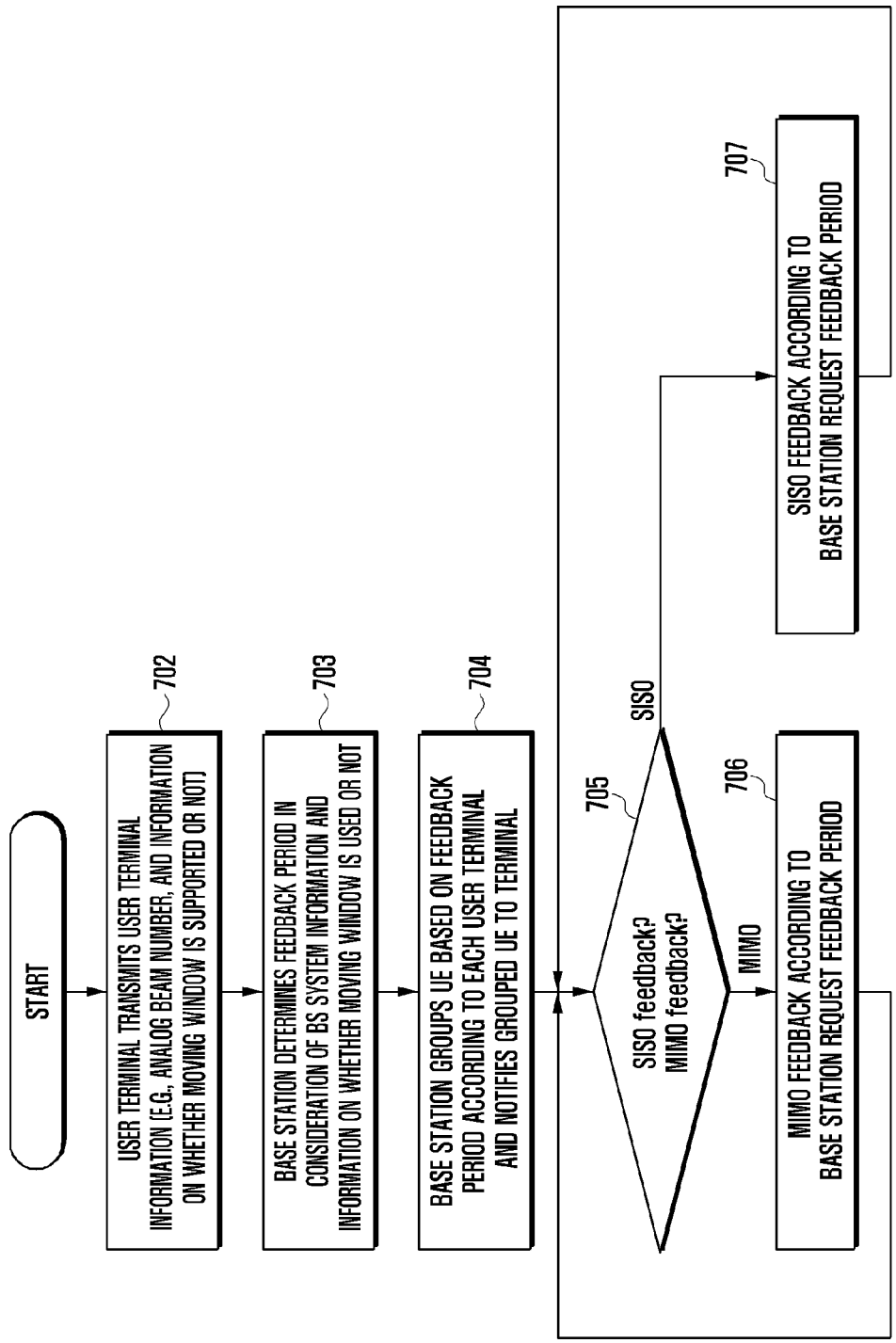
FIG. 7 is a flowchart illustrating a process of determining a feedback period of a terminal by a base station and transmitting feedback information according to the determined feedback period by the terminal according to an embodiment of the present disclosure.

FIG. 7 is a flowchart illustrating a process of determining a feedback period of a terminal by a base station and transmitting feedback information according to the determined feedback period by the terminal.

Referring to FIG. 7, in operation 702, the terminal may transmit user terminal information (e.g., the number of analog beams and information on whether a moving window is supported or not) to the base station.

Thereafter, in operation 703, the base station determines the feedback period of the terminal based on BS system information and information on whether the terminal uses the moving window.

Thereafter, in operation 704, the base station may group users based on the feedback period according to each user terminal and notify a result of the grouping to each user terminal.

Thereafter, in operation 705, the terminal identifies whether the feedback requested from the base station is a SISO mode or a MIMO mode.

In the case of the MIMO mode, the terminal performs operation 706 to transmit the MIMO feedback to the base station according to the feedback period requested by the base station. In contrast, in the case of the SISO mode, the terminal performs operation 707 to transmit the SISO feedback to the base station according to the feedback period requested by the base station.

The terminal determines the best beam ID, the PMI and the like among the combinations of the beams determined according to embodiment of the present disclosure. In addition, the terminal transmits the best beam ID, the PMI, and the like to the base station through an uplink feedback (shown in FIG. 3) every feedback period.

However, since the combinations of the analog beam and the digital precoding, which are to be determined are many, when the best beam is selected based on all combinations, a processing time may be still much consumed.

Therefore, hereinafter, a low complexity algorithm capable of reducing a processing time required in a beam selection will be proposed.

A method of reducing a complexity according to an embodiment of the present disclosure may be classified as two categories.

A first category is a method (e.g., a beam search space) of reducing candidates of a beam to be used when the best beam is selected.

A second category is a method of reducing an amount (e.g., a simplified BM-RS measurement) of information to be used in a best beam selection among the selected beams.

Figure 8:
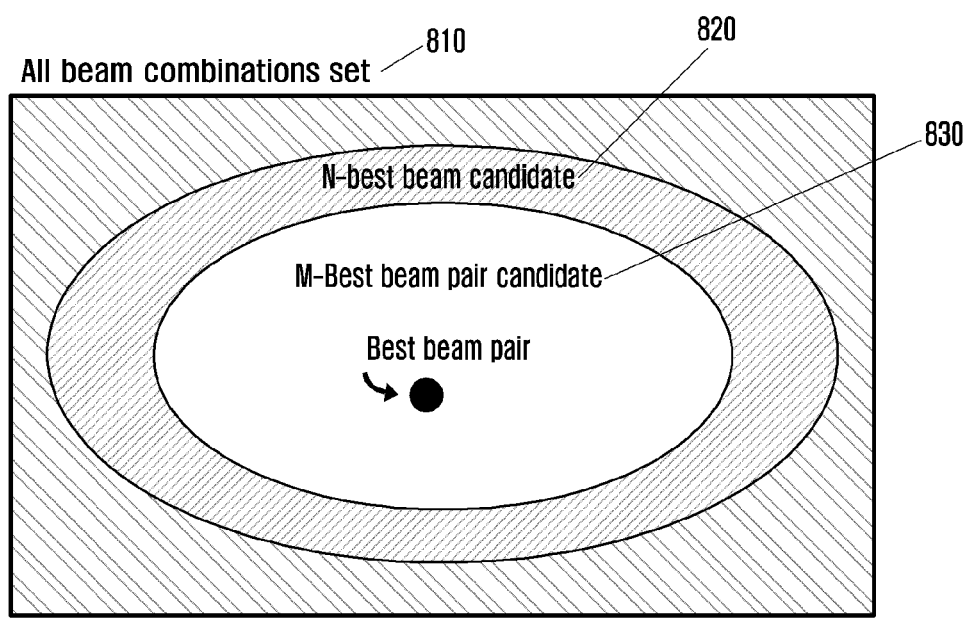
FIG. 8 illustrates a block diagram for a Multi Input Multi Output (MIMO) feedback when a low complexity algorithm according to an embodiment of the present disclosure.

First, the method of reducing beam candidates to be used in the beam selection proposed in the embodiment of present disclosure is shown in FIG. 8.

FIG. 8 illustrates a block diagram for a MIMO feedback when a low complexity algorithm according to an embodiment of the present disclosure is considered according to an embodiment of the present disclosure.

The method of reducing the beam search space according to an embodiment of the present disclosure, is a searching for the best beam and the PMI for specific beams selected through a filtering, rather than a searching for the best beam and the PMI for the combinations of all analog beams and the digital precoding.

The above-mentioned filtering may be performed at least once.

Referring to FIG. 8, N best beam candidate 820 may be selected through a first filtering, among all beams combinations set 810 for the transmitting and receiving ends. In addition, M best beam pair candidate 830 may be selected through a second filtering.

Examples of the above-mentioned first filtering method and the second filtering method are described.

The first filtering method is described. When the terminal receives a BM-RS transmitted from the base station, the terminal may measure channel power between to base station and a chain of the terminal. At this time, the terminal may exclude a beam combination which is not higher than a specific standard, for example, a beam combination which is not higher than a certain received signal strength from a beam candidate for selecting a best beam. The terminal may select N candidate among all beam combinations through such a method.

The second filtering method is described. The second filtering method is a method of selecting M best beam pair candidate 830 maximizing overall power of chains between the base station and the terminal.

The above-mentioned first filtering method and second filtering method may be equally or independently used. For example, in all possible beam combinations, the first filtering method is performed and then the second filtering method targeting this may be performed again, or the filtering methods may be performed inversely to this. Alternatively, in all possible beam combinations, only the first filtering method may be performed, or only the second filtering method may be performed.

In addition, the filtering method may be performed by applying another standard. For example, a Signal to Noise Ratio or a Signal to Interference-plus-Noise Ratio instead of the channel power may be applied.

Hereinafter, an embodiment in which the second filtering method among the above filtering methods is described.

Equation 2 below is an example for an equation which may be used when the second filtering is performed in order to select M best beam pair candidate 830.

$$(\vec{\theta}_i, \vec{\phi}_j) = \arg\max_{\vec{\theta} \in \Theta, \vec{\phi} \in \Phi} \sum_{k=0}^{N_{ch}-1} \|V^T(\vec{\phi}_j)H(k)W(\vec{\theta}_i)\|_F^2 \quad \text{Equation 2}$$

$$\vec{\theta}_i = (\theta_1, \theta_2, \ldots \theta_{N_i^b}) \in N_t^b, \vec{\phi}_j = (\theta_1, \theta_2, \ldots \theta_{N_j^b}) \in N_r^b$$

In Equation 2 above, $W(\vec{\theta}_1)$ is a transmitted analog beamforming matrix of the base station, and $V(\vec{\phi}_1)$ is a received analog beamforming matrix of the terminal.

When the terminal receives BM-RSs according to each received analog beam, terminal may know $N_{ch}$ pieces of channel information (i.e., $V^T(\vec{\phi}_1)H(k)W(\vec{\theta}_1)=H_{bb}(k)$).

$\theta_i$ is an analog beam index according to a transmission chain (i) of the base station, and this refers to one among $N_r^b$ analog beams supported by the base station.

$\phi_j$ is an analog beam index according to a reception chain (j) of a mobile terminal, and this refers to one among $N_r^b$ analog beams.

The terminal may M beam combinations maximizing reception channel power according to a chain between a transmitter and a receiver, among all beam combinations between the transmitter and the receiver. To this end, the terminal may find M analog beam combinations between the transmitter and the receiver, which maximizes a sum of squared Frobenius norm ($\|\cdot\|_F^2$), r using a received BM-RS.

According to the above-mentioned method, that is, according to a first category, the terminal may reduce a candidate group for selecting the best beam pair.

The second category according to an embodiment of the present disclosure reduces an information amount (i.e., simplified BM-RS measurement) to be used in the best beam selection among the selected beam combinations (i.e., candidate group) to reduce calculation complexity.

To this end, when channel capacities according to each of all (i.e., Nch) baseband channels (Hbb) are determined and a beam combination ($\vec{\theta}_i, \vec{\phi}_j, n$) maximizing a capacity for all channels is selected as the best beam, complexity is very high, and thus a time is much consumed.

Therefore, when channel capacities for each combination including a transmitted beam and a received beam are determined, it is necessary to reduce the calculation complexity.

Figure 9:
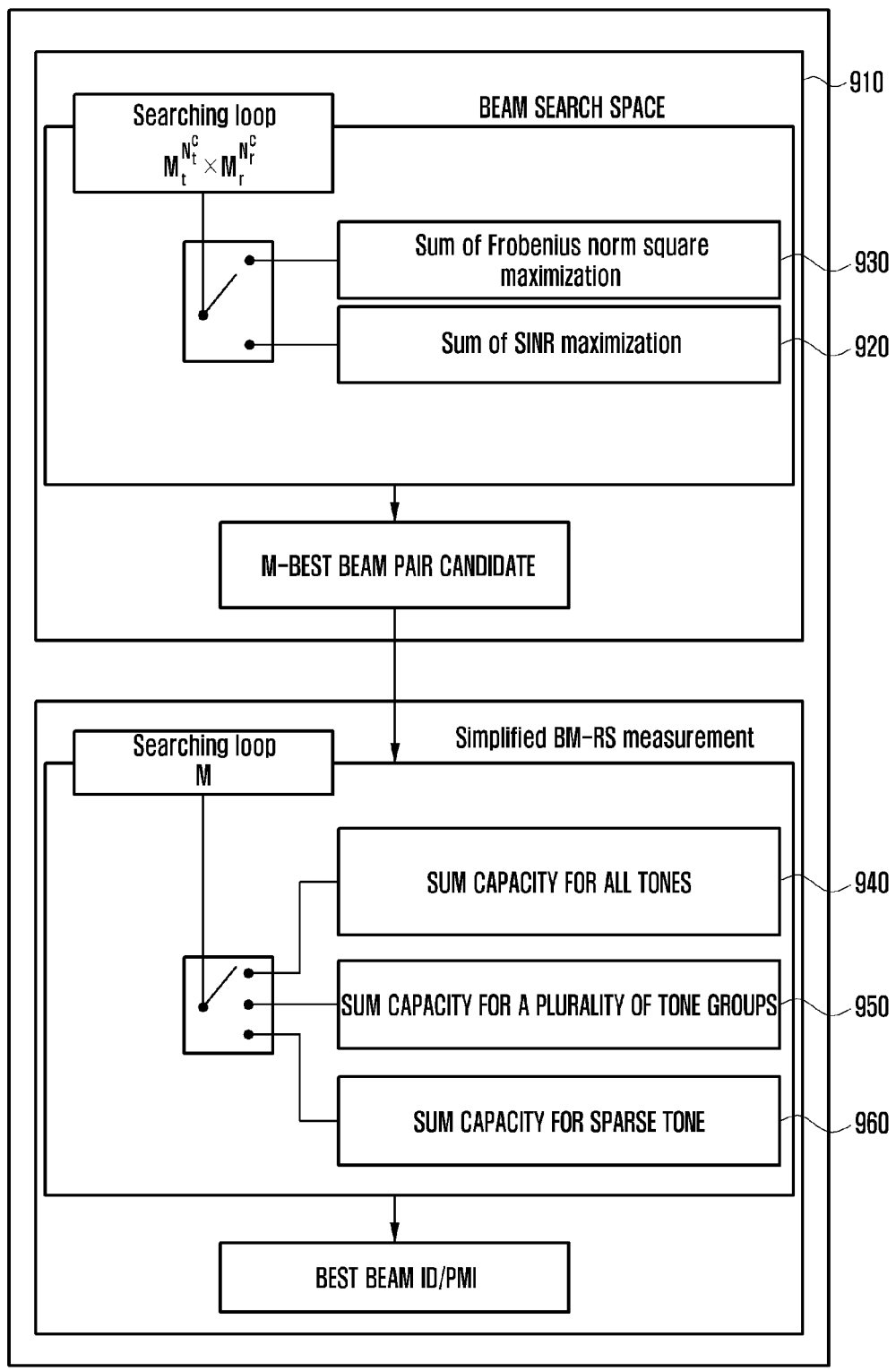
FIG. 9 illustrates an algorithm for selecting a best beam according to a first category and a second category according to an embodiment of the present disclosure.

FIG. 9 illustrates an algorithm for selecting a best beam according to a first category and a second category according to an embodiment of the present disclosure.

Referring to FIG. 9, a reference numeral 910 refers to a beam search space, and shows a method of reducing a space to be searched according to the first category.

As described above, M analog beam combination between the transmitter and the receiver may be limited to the beam search space as shown in a reference numeral 920 through the first filtering method. Alternatively, according to another embodiment of the present, as shown in a reference numeral 930, a combination which maximizes reception power or is greater than a certain critical value may be limited to the beam search space using channel power information between the base station and the chain of the terminal, and the like.

Thereafter, reference numerals 940 to 960 show a method of reducing complexity when a channel capacity is determined according to the second category of the present disclosure.

The reference numeral 940 may be a method of determining a sum capacity for all tones (frequencies, or subcarriers), and may correspond to issues of the related art.

The reference numeral 950 is a method of using a sum capacity for a plurality of tone groups. This is a method of reducing complexity in determining the channel capacity by averaging channels values for subcarriers in which transmitted the same BM-RSs, based on a transmission of a BM-RS for a normal beam through at least one (e.g., preferably six) subcarrier.

The reference numeral 960 follows the method of the reference numeral 950, but some of the subcarriers in which the same BM-RSs are transmitted according to a certain standard or transmitted randomly is not reflected to the averaging of the channel values in the reference numeral 960, and thus the reference numeral 960 is a method of reducing complexity in determining the channel capacity.

A method of performing the above-mentioned second category will be specifically described with reference to FIGS. 10 to 12.

Figure 10:
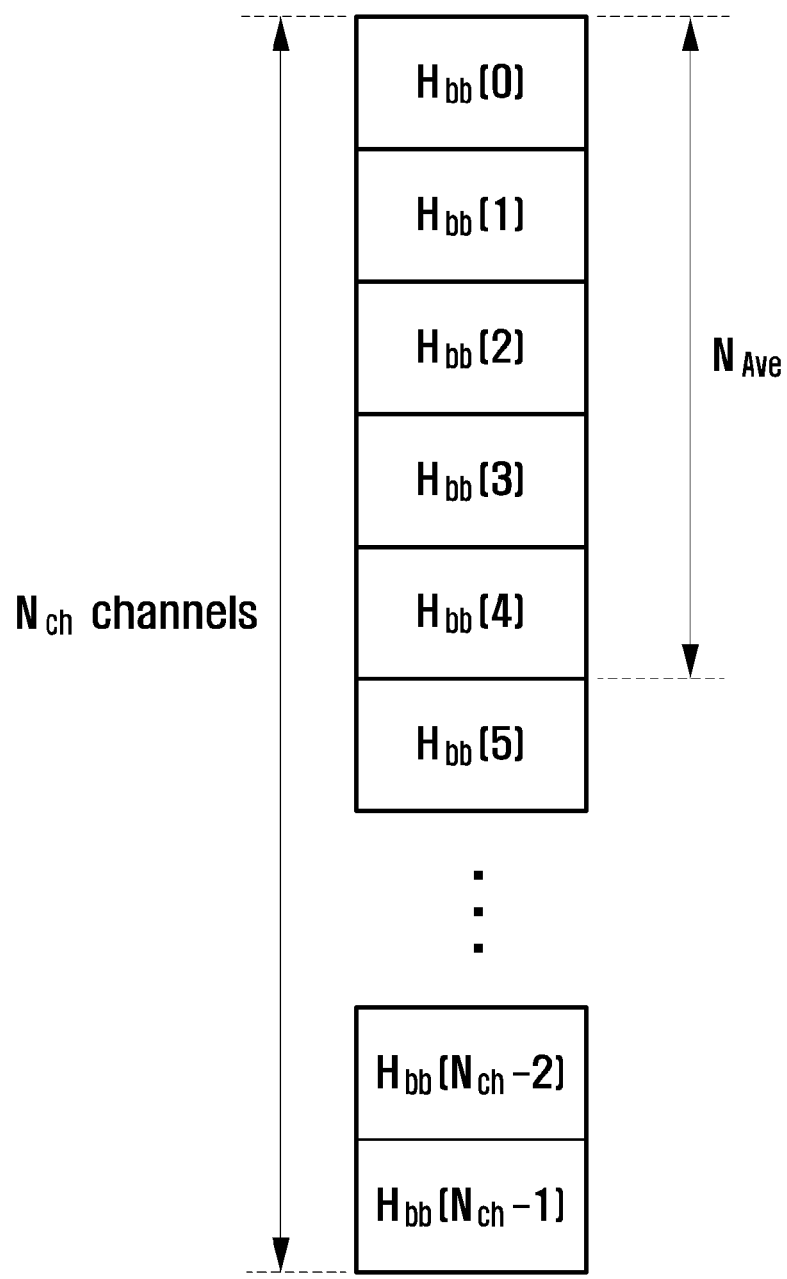
FIG. 10 illustrates a necessary channel to be used when a best beam is selected among selected beam combinations according to an embodiment of the present disclosure.

FIG. 10 illustrates a necessary channel to be used when a best beam is selected among selected beam combinations according to an embodiment of the present disclosure.

Equation 3 below shows an equation of the necessary channel.

$$(\vec{\theta}_i, \vec{\phi}_j, P_n) = \arg\max_{\vec{\theta}\in\Theta, \vec{\phi}\in\Phi, P_n\in P} \sum_{k=0}^{N_{ch}-1} \log_2\det\left(I_{N_t^b} + \frac{E_s}{N_0} H_{bb}(k) P_n P_n^H H_{bb}^H(k)\right) \quad \text{Equation 3}$$

In Equation 3, P is a digital precoding matrix, and n is an index of a precoding matrix.

Referring to Equation 3 and FIG. 10, in order to select the best beam, channel capacities according to each of $N_{ch}$ channels should be determined.

However, in order to the channel capacity, a relatively much processing time is necessary, and thus it is necessary to reduce a calculation amount.

To this end, in an embodiment of the present disclosure, as shown in FIG. 10, a method of reducing the number of channels of which capacities should be determined is proposed. For example, in an embodiment of the present disclosure, an average value of channel values for subcarriers (i.e., frequencies) grouped according to a specific standard, and the channel capacity is determined based on the average value.

A first method of reducing the number of the channels of which the capacities should be determined from $N_{ch}$ to $N_{ave}$ is described with reference to FIG. 11.

Figure 11:
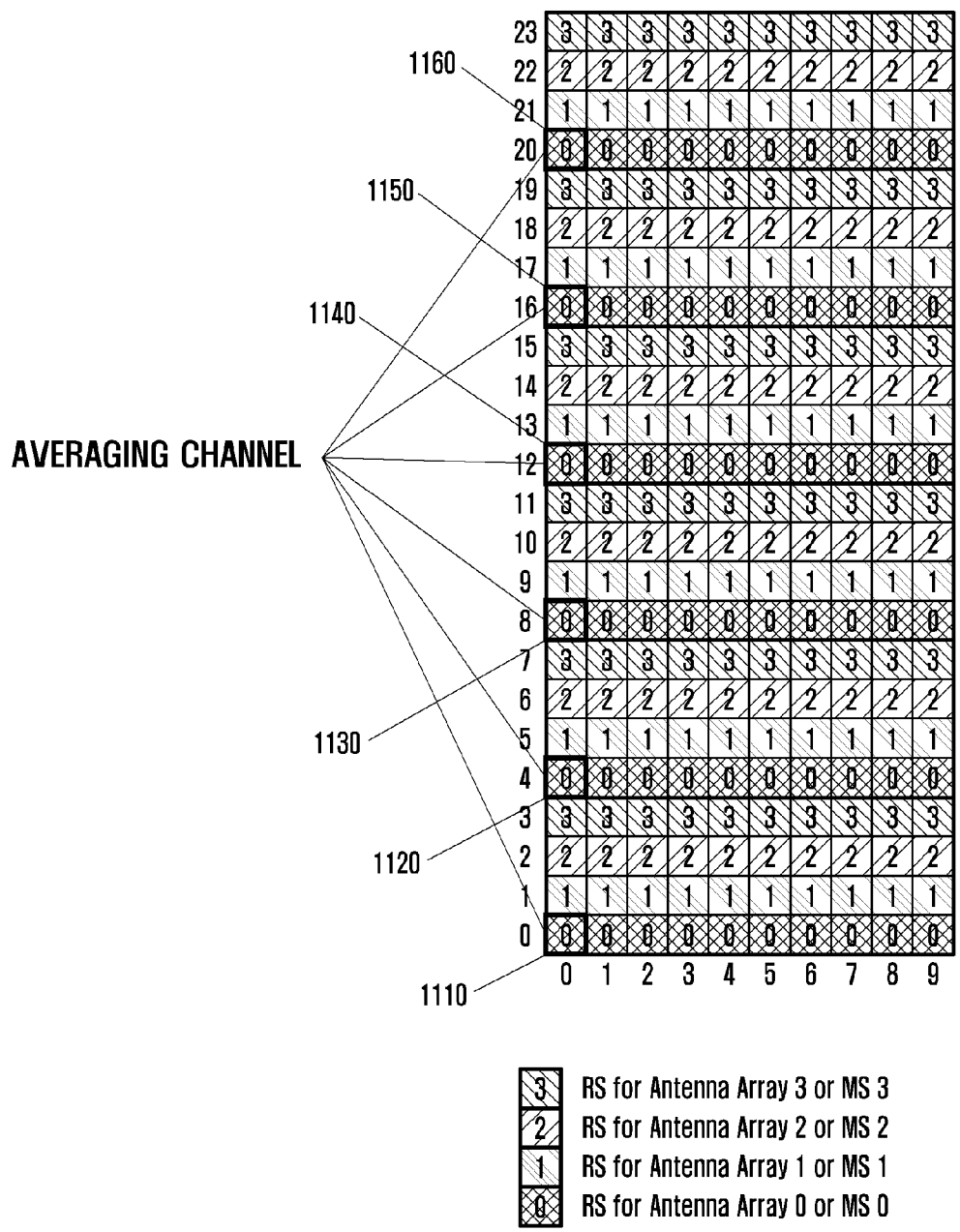
FIG. 11 illustrates a method of reducing a number of channels of which capacities should be determined according to an embodiment of the present disclosure.

FIG. 11 illustrates a method of reducing a number of channels of which capacities should be determined according to an embodiment of the present disclosure.

Referring to FIG. 11, a method of selecting a final best beam and the PMI by determining a sum channel capacity for R(k) after determining an average covariance channel matrix of $N_{ave}$ channel (shown in FIG. 10) in order to reduce the number of the channels of which the capacities should be determined is illustrated.

Describing more specifically, a horizontal axis of FIG. 11 may refer to a direction of a transmitted beam and a vertical axis of FIG. 11 may refer to a frequency.

In the related art, channel capacities for each channel (i.e., one small quadrangle) formed of one beam direction and one frequency are determined. In such a case, the number of channels to be determined are many, calculation complexity is high, and thus a lot of processing time is consumed.

In an embodiment of the present disclosure, in order to propose a method of determining a channel capacity of low complexity, an average value of channel values for a plurality of channels 1110, 1120, 1130, 1140, 1150 and 1160 is determined, and then the channel capacity is determined based on the average value of the channel values. For example, a BM-RS for No. 0 of Tx beam is divided into six frequencies 0, 4, 8, 12, 16 and 20 and transmitted to the terminal. The terminal calculates an average value of channels values through six frequencies, and then determines a channel capacity for No. 0 of Tx beam.

A specific process related to this is described with reference to an equation below.

Equation 4 is an equation for determining a channel capacity using an average covariance channel matrix R(k).

$$(\vec{\theta}_i, \vec{\phi}_j, P_n) = \arg\max_{\vec{\theta}\in\Theta, \vec{\phi}\in\Phi, P_n\in P} \sum_{k=0}^{N_{group}-1} \log_2\det\left(I_{N_t^b} + \frac{E_s}{N_0} R(k)\right) \quad \text{Equation 4}$$

In this case, the average covariance channel matrix R(k) may be determined by Equation 5.

$$R(k) = \frac{1}{N_{ave}} \sum_{l=N_{ave} \cdot k}^{N_{ave} \cdot (k+1)-1} H_{bb}(l) P_n P_n^H H_{bb}^H(l) \quad \text{Equation 5}$$

In Equation 5 below, $H_{bb}$ is a baseband channel, P is a digital precoding matrix, and n is an index of a precoding matrix. In order to select a best beam in the related art, the channel capacities according to each of $N_{ch}$ channels should be determined. In contrast, in an embodiment of the present disclosure, the channel capacities according to each of $N_{group}$ channels are determined. At this time, Ngroup is the number of groups necessary in determining the channel capacity as $N_{group} = N_{ch}/N_{avg}$, and $N_{avg}$ is the number of channels necessary in determining an average channel.

A second method of reducing the number of channels of which capacities should be determined from $N_{ch}$ to $N_{ch}/N_{sparse}$ is described with reference to FIG. 12.

Figure 12:
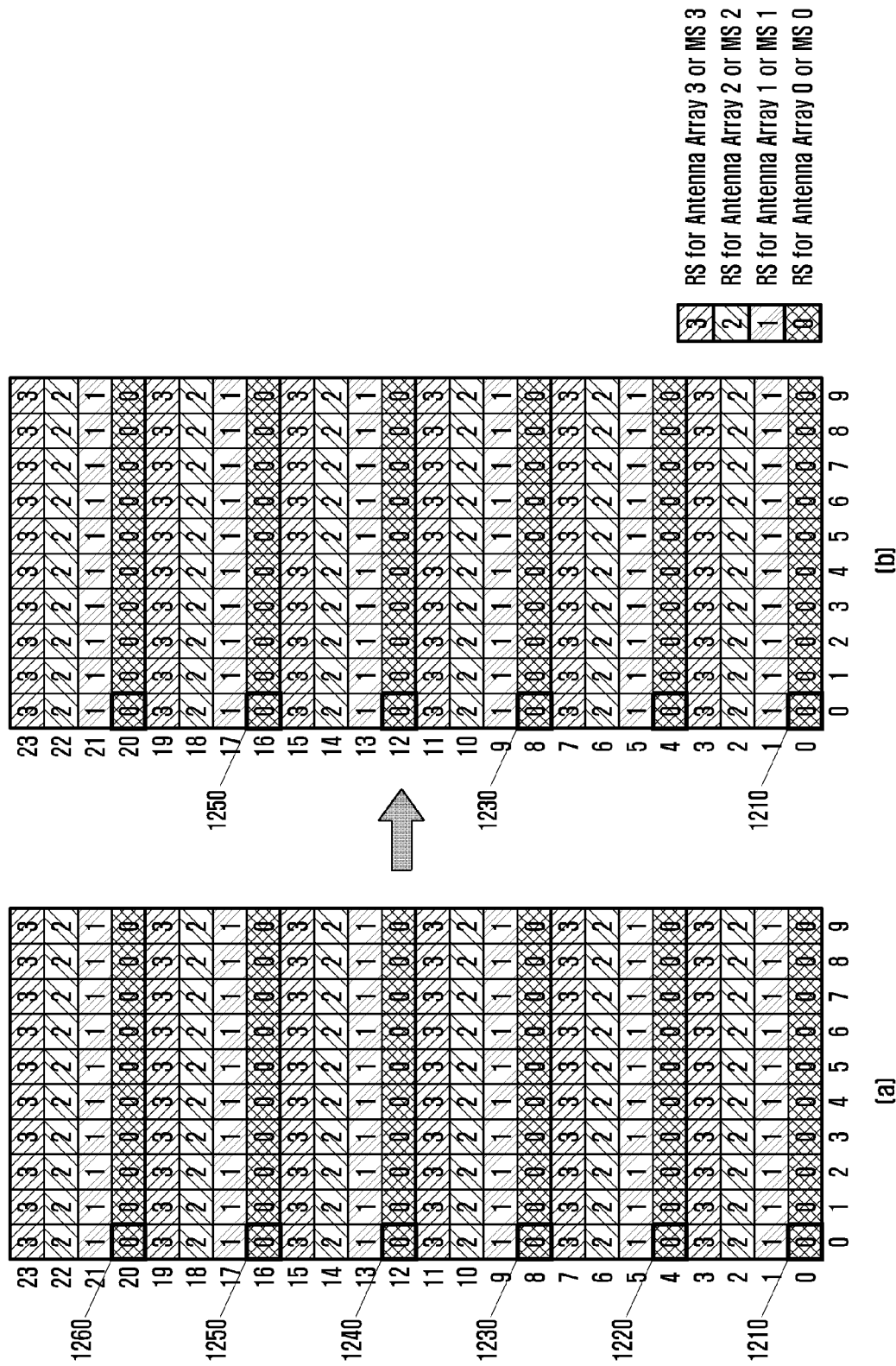
FIG. 12 illustrates a method of reducing a number of channels of which capacities should be determined according to an embodiment of the present disclosure.

FIG. 12 illustrates a method of reducing a number of channels of which capacities should be determined according to an embodiment of the present disclosure.

Referring to FIG. 12, it illustrates a method using a beam combination maximizing a sum capacity for $N_{ch}/N_{sparse}$ channels among $N_{ch}$ channels as a best beam and a PMI.

In the same manner as FIG. 11, a horizontal axis of FIG. 12 may refer to a direction of a transmitted beam and a vertical axis of FIG. 12 may refer to a frequency.

For example, when a channel capacity for a plurality of channels 1210, 1220, 1230, 1240, 1250 and 1260 is determined, a channel capacity for remaining channels 1210, 1230 and 1250 except for some 1220, 1240 and 1260 of the plurality of channels 1210, 1220, 1230, 1240, 1250 and 1260 is determined.

To this end, a channel which is excluded when an average value of channel values is determined may be determined according to a certain rule. For example, a plurality of frequencies in which a BM-RS is transmitted may be alternately reflected or non-reflected to the calculation of the channel capacity. For example, when indexes of frequencies in which the same BM-RSs are transmitted are 0, 4, 8, 12, 16 and 20, channels corresponding to 0, 8 and 16 may be applied to the calculation of the channel capacity or channels corresponding to 4, 12 and 20 may be applied to the calculation of the channel capacity.

Alternatively, channel reflected to the calculation of the channel capacity may be randomly selected.

In embodiments of the present disclosure, a method of selecting the channel is not limited to a specific embodiment.

Equation 6 shows a method of determining an average of a channel according to an embodiment shown in FIG. 12.

$$(\vec{\theta}_i, \vec{\phi}_j, P_n) = \arg \max_{\vec{\theta} \in \Theta, \vec{\phi} \in \Phi, P_n \in P} \sum_{k=0}^{N_{ch}/N_{sparse}-1} \log_2$$

$$\det\left(I_{N_f^c} + \frac{E_s}{N_0} \frac{1}{N_f^c} H_{bb}(k \cdot N_{sparse}) P_n P_n^H H_{bb}^H(k \cdot N_{sparse})\right) \quad \text{Equation 6}$$

In Equation 6 above, Hbb is a baseband channel, P is a digital precoding matrix, and n is an index of a precoding matrix. In order to select a best beam in the related art, the channel capacities according to each of $N_{ch}$ channels should be determined. In contrast, in an embodiment of the present disclosure, the channel capacities according to each of $N_{sparse}$ channels are determined.

When a method of filtering a best beam candidate using a concept of a moving window is used, it is necessary to consider an Automatic Gain Control (AGC) value which is used in receiving a BM-RS in the filtering.

Figure 13:
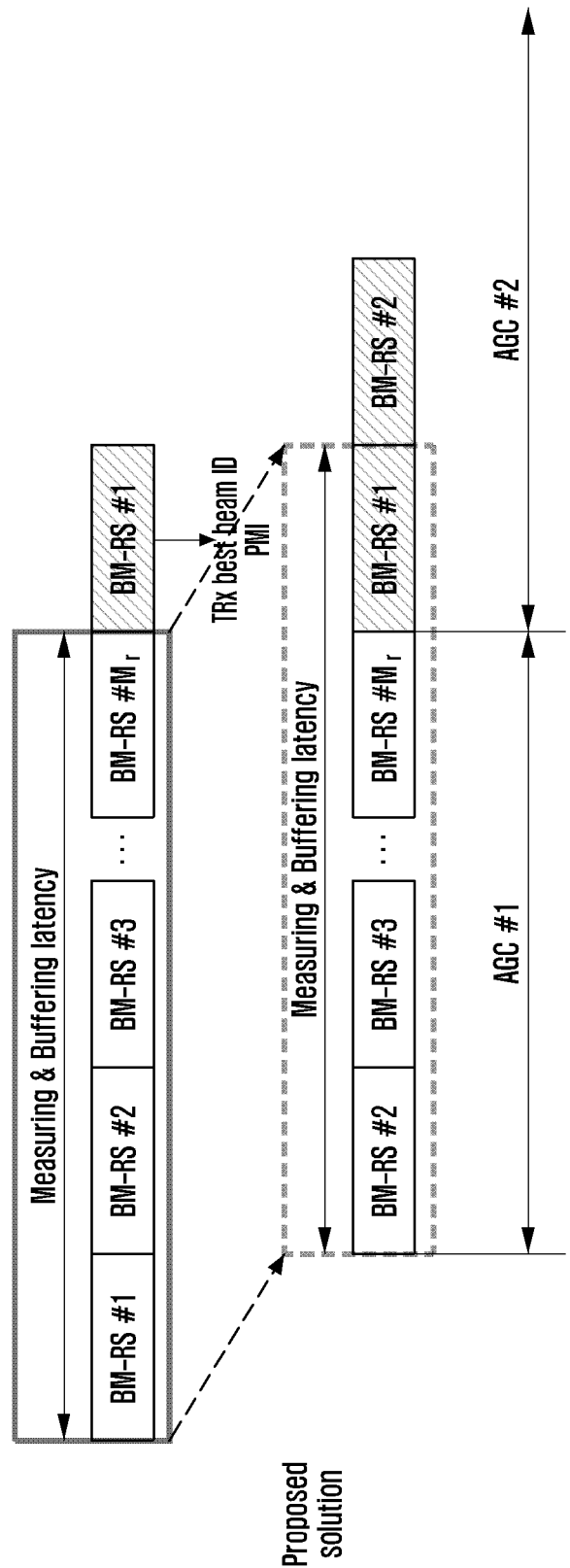
FIG. 13 illustrates a process of changing automatic gain control information in a case of using a moving window according to an embodiment of the present disclosure.

FIG. 13 illustrates a process of changing automatic gain control information in a case of using a moving window according to an embodiment of the present disclosure.

Referring to FIG. 13, because all AGC values used when the terminal receives the BM-RS and stores channel information may be different. Alternatively, the same AGC value may be used while a received (Rx) beam sweep is performed.

However, when the moving window is considered and when a difference of the AGC values is considered, Equation 2 above may be corrected to Equation 7 such that the AGC value is considered.

$$(\vec{\theta}_i, \vec{\phi}_j) = \arg \max_{\vec{\theta} \in \Theta, \vec{\phi} \in \Phi} \sum_{k=0}^{N_{ch}-1} \left\| V^T(\vec{\phi}_j)(H(k) \circ G) W(\vec{\theta}_i) \right\|_F^2 \quad \text{Equation 7}$$

$$\vec{\theta}_i = (\theta_1, \theta_2, \ldots \theta_{N_f^b}) \in N_t^b, \vec{\phi}_j = (\theta_1, \theta_2, \ldots \theta_{N_f^b}) \in N_r^b$$

At this time, G is a matrix for the AGC value. The size of matrix G is $[N^r_c \times N^t_c]$, and ∘ is an element wise product.

In addition, in order to accurately determine channel capacity, it is necessary to reflect noise measured according to reception chains of each mobile terminal when the BM-RS is received. When the noise is reflected, Equation 3 above may be corrected to Equation 8.

$$(\vec{\theta}_i, \vec{\phi}_j, P_n) = \arg \max_{\vec{\theta} \in \Theta, \vec{\phi} \in \Phi, P_n \in P} \log_2 \quad \text{Equation 8}$$

$$\det\left(I_{Nt} + \begin{bmatrix} \frac{1}{\sigma_0^2} & \cdots & 0 \\ \vdots & \ddots & \vdots \\ 0 & \cdots & \frac{1}{\sigma_{N_r^b-1}^2} \end{bmatrix} \begin{bmatrix} h_{00} & \cdots & h_{00-1} \\ \vdots & \ddots & \vdots \\ h_{00-10} & \cdots & h_{00-10-1} \end{bmatrix} \begin{bmatrix} \frac{E_s}{N_f^c} & \cdots & 0 \\ \vdots & \ddots & \vdots \\ 0 & \cdots & \frac{E_s}{N_f^c} \end{bmatrix} \begin{bmatrix} h_{00} & \cdots & h_{00-1} \\ \vdots & \ddots & \vdots \\ h_{00-10} & \cdots & h_{00-10-1} \end{bmatrix}^H \right)$$

$\sigma^2 N_r^c$ is a variance of the noise measured according to each reception chains.

Figure 14:
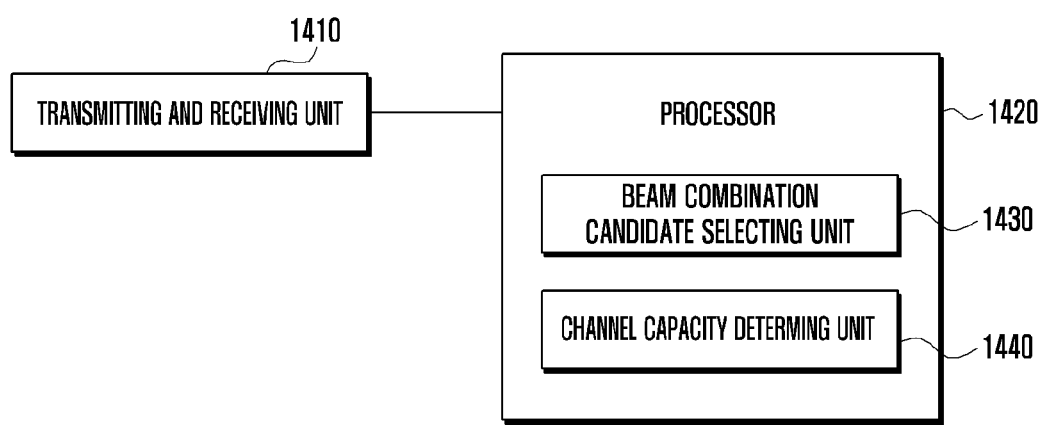
FIG. 14 is a block diagram illustrating an internal structure of a terminal according to an embodiment of the present disclosure.

FIG. 14 is a block diagram illustrating an internal structure of a terminal according to an embodiment of the present disclosure.

Referring to FIG. 14, the terminal of the present disclosure may include a transmitting and receiving unit 1410 and at least one processor 1420.

The transmitting and receiving unit 1410 may transmit and receive a signal to and from a base station (e.g., a transmitter). Specifically, the transmitting and receiving unit 1410 may include a hybrid beam forming structure configured with an analog beamforming unit and a digital beamforming unit in a H-BF system, in the same manner as a base station structure shown in FIG. 4. A specific structure of the transmitting and receiving unit 1410 corresponds to the structure shown in FIG. 4, and thus a description related to the specific structure of the transmitting and receiving unit 1410 is omitted. In this case, the analog beamforming unit includes $N_R$ array antennas, one array antenna includes $N^{RF}_R$ element antennas, and transmit and receive data by applying a beamforming.

The processor 1420 may control signal flows between each block such that the terminal may operate according to an embodiment of the present disclosure. For example, the processor 1420 may control sequential processes in which the terminal selects a best combination of a transmitted beam and a received beam. To this end, the processor 1420 may further include a beam combination candidate selecting unit 1430 and a channel capacity determining unit 1440.

When the beam combination candidate selecting unit 1430 receives at least one of each transmitted beam transmitted from the base station with respect to each received beam of the terminal, the beam combination candidate selecting unit 1430 may determine reception power related information for a beam combination including the transmitted beam and the received beam. In this case, the reception power related information may include at least one of a reception signal strength for the beam combination, a Signal to Noise Ratio (SNR), and a Signal to Interference-plus-Noise Ratio (SINR). In addition, as a result of the calculation, the beam combination candidate selecting unit 1430 may select a beam combination which is equal to or greater than a certain critical value as a beam combination candidate and output the beam combination to the channel capacity determining unit 1440. Thereafter, the channel capacity determining unit 1440 may determine a channel capacity for the selected candidates.

In addition, when the beam combination candidate selecting unit 1430 according to another embodiment of the present disclosure receives at least one of each transmitted beam transmitted from the base station with respect to each received beam of the terminal, the beam combination candidate selecting unit 1430 may select a certain number of analog beam combination maximizing a channel capacity as the beam combination candidate, among analog beam combinations including the transmitted beam and the received beam, and may output the analog beam combination to the channel capacity determining unit 1440. Thereafter, the channel capacity determining unit 1440 may determine a channel capacity for the selected candidates.

The channel capacity determining unit 1440 may determine the channel capacity for at least one beam combination candidate output from the beam combination candidate selecting unit 1430. In this case, the channel capacity determining unit 1440 may determine an average value of a channel state for at least one subcarrier in which a transmitted beam having the same identifier is transmitted and may determine the channel capacity based on the average value of the channel state.

More specifically, according to an embodiment of the present disclosure, the channel capacity determining unit 1440 may average the channel state for all subcarriers in which the transmitted beam having the same identifier is transmitted and determine the channel capacity based on the averaged channel state.

Alternatively, according to another embodiment of the present disclosure, the channel capacity determining unit 1440 may determine the channel capacity for remaining subcarriers except for a random subcarrier among at least one subcarrier in which the transmitted beam having the same identifier is transmitted. In this case, as a result of the calculation, the channel capacity determining unit 1440 may feed back a beam combination of which a channel capacity is largest to the base station.

Meanwhile, in the above, the processor 1420 includes the beam combination candidate selecting unit 1430 and the channel capacity determining unit 1440, and the processor 1420 includes the beam combination candidate selecting unit 1430 and the channel capacity determining unit 1440 performs different functions, but it not limited thereto. For example, the function performed by the beam combination candidate selecting unit 1430 may be directly performed by the processor 1420.

When the best beam identifier (ID), the PMI and the like are fed back using the BM-RS in the wireless communication system based on the hybrid beamforming using the superhigh frequency band according to the embodiment of the present disclosure, a feedback delay can be reduced. Thus, performance degradation owing to the feedback delay and the processing delay can be prevented.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a terminal in a wireless communication system supporting a beamforming, the method comprising:
   receiving reference signals which are transmitted from a base station via transmission beams of the base station, via reception beams of the terminal;
   determining reception power related information for beam combinations of the transmission beams and the reception beams;
   identifying, among the beam combinations, at least one first beam combination of which the reception power related information is equal to or greater than a predetermined value; and
   determining beam related information by selecting, among the at least one first beam combination, at least one second beam combination based on channel capacities of the at least one first beam combination.

2. The method of claim 1, wherein the beam related information comprises:
   a transmission and reception beam identifier corresponding to the selected at least one second beam combination, and
   a precoding matrix index for the transmission and reception beam identifier.

3. The method of claim 2, wherein the transmission and reception beam identifier is determined by an analog beam and a digital precoding combination.

4. The method of claim 1, wherein the reception power related information comprises at least one of a received signal strength, a Signal to Noise Ratio (SNR), or a Signal to Interference-pulse-Noise Ratio (SINR) for the beam combinations.

5. A method by a terminal in a wireless communication system supporting a beamforming, the method comprising:
receiving reference signals which are transmitted from a base station via transmission beams of the base station, via reception beams of the terminal;
identifying, among the beam combinations of the transmission beams and the reception beams, predetermined numbers of a first beam combinations maximizing a reception power of the reference signals; and
determining beam related information by selecting, among the first beam combinations, at least one second beam combination based on channel capacities of the first beam combinations.

6. The method of claim 5,
wherein the beam related information comprises a transmission and reception beam identifier corresponding to the selected at least one second beam combination, and a precoding matrix index for the transmission and reception beam identifier, and
wherein the transmission and reception best beam identifier is determined by an analog beam and a digital precoding combination.

7. A method by a terminal in a wireless communication system supporting a beamforming, the method comprising:
receiving reference signals which are transmitted from a base station via transmission beams of the base station, via reception beams of the terminal;
identifying channel capacities for beam combinations of the transmission beams and the reception beams; and
determining beam related information by selecting, among the beam combinations, at least one beam combination based on the channel capacities for the beam combinations,
wherein the identifying of the channel capacities comprises averaging a channel state for at least one subcarrier in which at least one of the transmission beams including the same identifier is transmitted, and identifying the channel capacities based on the averaged channel state.

8. The method of claim 7, wherein the beam related information comprises:
a transmission and reception beam identifier corresponding to the selected at least one beam combination, and
a precoding matrix index for the transmission and reception beam identifier.

9. The method of claim 8, wherein the transmission and reception beam identifier is determined by an analog beam and a digital precoding combination.

10. The method of claim 7, wherein the identifying of the channel capacities comprises averaging channel states for all subcarriers in which the at least one of the transmission beams including the same identifier is transmitted, and identifying the channel capacities based on the averaged channel states.

11. The method of claim 7, wherein the identifying of the channel capacities comprises:
identifying channel capacities for remaining subcarriers except for a random subcarrier among the at least one subcarrier in which the at least one of the transmitted beams having the same identifier is transmitted; and
giving a feedback on a beam combination of which a channel capacity is largest, based on a result of the identifying of the channel capacities.

12. A method by a terminal in a wireless communication system supporting a beamforming, the method comprising:
receiving reference signals which are transmitted from a base station via transmission beams of the base station, via reception beams of the terminal, in a first superframe including at least one frame;
generating first feedback information for beam combinations of the transmission beams and the reception beams, and transmitting the generated first feedback information to the base station at a first predetermined timing;
receiving reference signals which are transmitted from the base station via transmission beams of the base station, via reception beams of the terminal, while a first frame in a second superframe is elapsed after the first superframe is arrived; and
generating second feedback information for the beam combinations based on the first superframe and the first frame in the second superframe, and transmitting the generated second feedback information to the base station at a second predetermined timing.

13. The method of claim 12, wherein the generating of the second feedback information comprises generating the second feedback information based on the first frame in the second superframe, and a remaining frame except for a frame corresponding to the first frame in the second superframe among frames in the first superframe.

14. The method of claim 12, wherein an Automatic Gain Control (AGC) for the first feedback information and an AGC for the second feedback information are the same.

15. A terminal in a wireless communication system supporting a beamforming, the terminal comprising:
a transmitting and receiving unit configured to transmit and receive a signal to and from a base station; and
at least one processor configured to:
receive reference signals which are transmitted from a base station via transmission beams of the base station, via reception beams of the terminal,
determine reception power related information for beam combinations of the transmission beams and the reception beams,
identify, among the beam combinations, at least one first beam combination of which the reception power related information is equal to or greater than a predetermined value, and
determine beam related information by selecting, among the at least one first beam combination, at least one second beam combination based on channel capacities of the at least one first beam combination.

16. The terminal of claim 15, wherein the beam related information comprises a transmission and reception beam identifier corresponding to the selected at least one second beam combination, and a precoding matrix index for the transmission and reception beam identifier.

17. The terminal of claim 16, wherein the transmission and reception beam identifier is determined by an analog beam and a digital precoding combination.

18. The terminal of claim 15, wherein the reception power related information comprises at least one of a received signal strength, a Signal to Noise Ratio (SNR), or a Signal to Interference-pulse-Noise Ratio (SINR) for the beam combinations.

19. A terminal in a wireless communication system supporting a beamforming, the terminal comprising:
a transmitting and receiving unit configured to transmit and receive a signal to and from a base station; and
at least one processor configured to:
receive reference signals which are transmitted from the base station via transmission beams of the base station, via reception beams of the terminal,
identify, among the beam combinations of the transmission beams and the reception beams, predetermined numbers of a first beam combinations maximizing a reception power of the reference signals, and determine beam related information by selecting, among the first beam combinations, at least one second beam combination based on channel capacities of the first beam combinations.

20. The terminal of claim 19, wherein the beam related information comprises a transmission and reception beam identifier corresponding to the selected at least one beam combination, and a precoding matrix index for the transmission and reception beam identifier, and wherein the transmission and reception beam identifier is determined by the analog beam and a digital precoding combination.

21. A terminal for determining a beam in a wireless communication system supporting a beamforming, the terminal comprising:

a transmitting and receiving unit configured to transmit and receive a signal to and from a base station; and at least one processor configured to:

receive reference signals which are transmitted from the base station via transmission beams of the base station, via reception beams of the terminal, identify channel capacities for beam combinations of the transmission beams and the reception beams, and determine beam related information by selecting, among the beam combinations, at least one beam combination based on the channel capacities for the beam combinations wherein the processor averages a channel state for at least one subcarrier in which at least one of the transmission beams including the same identifier is transmitted, and identifies the channel capacities based on the averaged channel state.

22. The terminal of claim 21, wherein the beam related information comprises:

a transmission and reception beam identifier corresponding to the selected at least one beam combination, and a precoding matrix index for the transmission and reception beam identifier.

23. The terminal of claim 22, wherein the transmission and reception beam identifier is determined by an analog beam and a digital precoding combination.

24. The terminal of claim 21, wherein the processor is further configured to:

average channel states for all subcarriers in which the at least one of the transmission beams including the same identifier is transmitted, and identify the channel capacities based on the averaged channel states.

25. The terminal of claim 21, wherein the processor is further configured to:

control to identify channel capacities for remaining subcarriers except for a random subcarrier among the at least one subcarrier in which the at least one of the transmitted beams having the same identifier is transmitted, and give a feed back on a beam combination of which a channel capacity is largest based on a result of the identifying of the channel capacities.

26. A terminal for transmitting feedback information in a wireless communication system supporting a beamforming, the terminal comprising:

a transmitting and receiving unit configured to transmit and receive a signal to and from a base station; and at least one processor configured to:

receive reference signals which are transmitted from the base station via transmission beams of the base station, via reception beams of the terminal, in a first superframe including at least one frame, generate first feedback information for beam combinations of the transmission beams and the reception beams, transmit the generated first feedback information to the base station at a first predetermined timing, receive reference signals which are transmitted from the base station via transmission beams of the base station, via reception beams of the terminal, while a first frame in a second superframe is elapsed after the first superframe is arrived, generate second feedback information for the beam combinations based on the first superframe and the first frame in the second superframe, and transmit the generated second feedback information to the base station at a second predetermined timing.

27. The terminal of claim 26, wherein the processor is further configured to control to generate the second feedback information based on the first frame in the second superframe and a remaining frame except for a frame corresponding to the first frame in the second superframe among frames in the first superframe.

28. The terminal of claim 26, wherein an Automatic Gain Control (AGC) for the first feedback information and an AGC for the second feedback information are the same.

* * * * *